(12) United States Patent
Watts, Jr.

(10) Patent No.: US 8,566,621 B2
(45) Date of Patent: Oct. 22, 2013

(54) METHOD FOR IMPLEMENTING THERMAL MANAGEMENT IN A PROCESSOR AND/OR APPARATUS AND/OR SYSTEM EMPLOYING THE SAME

(75) Inventor: LaVaughn F. Watts, Jr., Temple, TX (US)

(73) Assignee: Texas Instruments Incorporated, Dallas, TX (US)

( * ) Notice: Subject to any disclaimer, the term of this patent is extended or adjusted under 35 U.S.C. 154(b) by 80 days.

(21) Appl. No.: 12/910,660

(22) Filed: Oct. 22, 2010

(65) Prior Publication Data

US 2011/0072282 A1 Mar. 24, 2011

Related U.S. Application Data

(63) Continuation of application No. 11/688,118, filed on Mar. 19, 2007, now Pat. No. 7,822,996, which is a continuation of application No. 08/568,904, filed on Dec. 7, 1995, now Pat. No. 7,194,646.

(51) Int. Cl.
*G06F 11/00* (2006.01)

(52) U.S. Cl.
USPC ........... 713/300; 713/310; 713/320; 713/321; 713/322; 713/323; 713/324; 713/330; 713/340

(58) Field of Classification Search
USPC .................. 713/300, 310, 320–324, 330, 340
See application file for complete search history.

(56) References Cited

U.S. PATENT DOCUMENTS

| | | |
|---|---|---|
| 5,167,024 A | 11/1992 | Smith et al. |
| 5,218,704 A | 6/1993 | Watts, Jr. et al. |
| 5,287,292 A | 2/1994 | Kenny et al. |
| 5,422,806 A | 6/1995 | Chen et al. |
| 5,493,684 A | 2/1996 | Gephardt et al. |
| 5,502,838 A | 3/1996 | Kikinis |
| 5,590,061 A | 12/1996 | Hollowell, II et al. |
| 7,822,996 B2 * | 10/2010 | Watts, Jr. ...................... 713/300 |

* cited by examiner

*Primary Examiner* — M Elamin
(74) *Attorney, Agent, or Firm* — Ronald O. Neerings; Wade James Brady; Frederick J. Telecky, Jr.

(57) ABSTRACT

A method for detecting temperature associated with a processor, results of the detecting being used for controlling power dissipation associated with the processor and/or apparatus and/or system employing the same.

39 Claims, 8 Drawing Sheets

METHOD FOR IMPLEMENTING THERMAL MANAGEMENT IN A PROCESSOR AND/OR APPARATUS AND/OR SYSTEM EMPLOYING THE SAME

This application is a Continuation of application Ser. No. 11/688,118 filed Mar. 19, 2007, now U.S. Pat. No. 7,822,996, which is a continuation of Continuation of application Ser. No. 08/568,904 filed Dec. 7, 1995, now U.S. Pat. No. 7,194,646.

REFERENCE TO COMPUTER PROGRAM LISTING APPENDIX ON COMPACT DISC

COMPUTER PROGRAM LISTING APPENDIX containing a compiler program listing is submitted on two identical compact discs. Each compact disc contains the file "TI-20567B—COMPUTER PROGRAM LISTING".

The compact disc file was created on November, 2010 and is 4,902 Kbytes in size. The compact disc COMPUTER PROGRAM LISTING APPENDIX is hereby incorporated herein by reference.

BACKGROUND OF THE INVENTION

1. Field of the Invention

This invention relates to real-time computer thermal management, and more particularly to an apparatus and method for decreasing and increasing central processing unit (CPU) clock time based on the temperature levels associated with operation of a CPU in a portable computer.

2. Description of the Related Art

During the development stages of personal computers, the transportable or portable computer has become very popular. Such portable computer uses a large power supply and really represents a small desktop personal computer. Portable computers are smaller and lighter than a desktop personal computer and allow a user to employ the same software that can be used on a desktop computer.

The first generation "portable" computers only operated from an A/C wall power. As personal computer development continued, battery-powered computers were designed. Furthermore, real portability became possible with the development of New display technology, better disk storage, and lighter components. Unfortunately, the software developed was designed to run on desk top computers without regard to battery-powered portable computers that only had limited amounts of power available for short periods of time. No special considerations were made by the software, operating system (MS-DOS), Basic Input/Output System (BIOS), or the third party application software to conserve power usage for these portable computers.

As more and more highly functional software packages were developed, desktop computer users experienced increased performance from the introductions of higher computational CPUs, increased memory, and faster high performance disk drives. Today, portable computer performance is rapidly approaching that of desktop computers. Pentium and 486 processors have a clock frequency of 90 Mhz+ are not uncommon. Unfortunately, these larger and faster processors consume increasingly higher amounts of energy. One byproduct of energy consumption is heat. Heat becomes a problem when the temperature within the CPU rises to a level sufficient to cause adverse computer performance. Overheating is not a big problem in desktop computers due to the relatively large case and board sizes, large heat sinks and ventilating fans of the desktop computers. Portable computers, on the other hand, have limited case and board sizes, relatively small heat sinks and no ventilating fans. Even if portable computers had the space for ventilating fans, there is insufficient battery power to operate them in an efficient manner. To make matters worse, competitive pressures are dictating a trend toward smaller and more compact portable computers having increasingly larger and faster processors.

Thermal over-heating of CPUs and other related devices is a problem yet to be addressed by portable computer manufacturers. CPUs are designed to operate within specific temperature ranges (varies depending on CPU type, manufacturer, quality, etc). CPU performance and speed degenerates when the limits of the operation temperature ranges are exceeded, especially the upper temperature range. This problem is particularly acute with CPUs manufactured using CMOS technology where temperatures above the upper temperature range result in reduced CPU performance and speed. Existing power saving techniques save power but do not measure and intelligently control CPU and/or related device temperature.

SUMMARY OF THE INVENTION

In view of the above problems associated with the related art, it is an object of the present invention to provide an apparatus and method for real-time thermal management for computer systems without any real-time performance degradation.

Another object of the present invention is to provide an apparatus and method for predicting CPU activity and relevant temperature levels and using the predictions for automatic temperature control.

Yet another object of the present invention is to provide an apparatus and method which allows user modification of automatic temperature level predictions and using the modified predictions for automatic temperature control.

A further object of the present invention is to provide an apparatus and method for controlling the temperature of the CPU through real-time reduction and restoration of clock speeds thereby returning the CPU to full processing rate from a period of inactivity which is transparent to software programs.

These objects are accomplished in a preferred embodiment of the present invention by an apparatus and method which determine whether a CPU may rest (including any PCI bus coupled to the CPU) based upon temperature levels relevant to a CPU and activates a hardware selector based upon that determination. If the CPU may rest, or sleep, the hardware selector applies oscillations at a sleep clock level; if the CPU is to be active, the hardware selector applies oscillations at a high speed clock level.

The present invention examines the state of the CPU relevant temperature, as well as the activity of both the operator and any application software currently active. This sampling of activity and temperature is performed real-time, adjusting the performance level of the computer to manage CPU temperature. These adjustments are accomplished within the CPU cycles and do no affect the user's perception of performance.

BRIEF DESCRIPTION OF THE DRAWINGS

The novel features believed characteristic of the invention are set forth in the appended claims. The invention itself, however, as well as other features and advantages thereof, will be best understood by reference to the detailed description with follows, read in conjunction with the accompanying drawings, wherein:

DETAILED DESCRIPTION OF PREFERRED EMBODIMENTS

Figure 1:
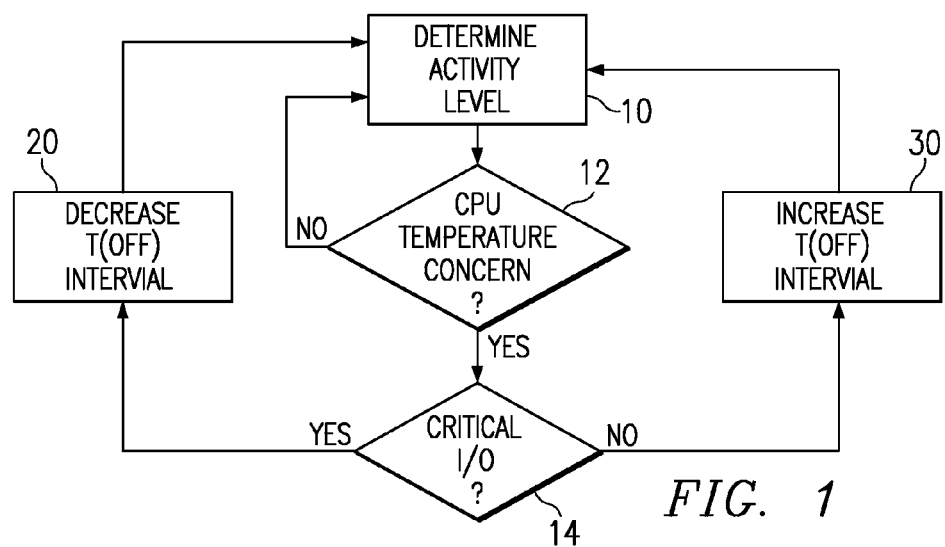
FIG. 1 is a flowchart depicting the self-tuning aspect of a preferred embodiment of the present invention.

If the period of computer activity in any given system is examined, the CPU and associated components have a utilization percentage. If the user is inputting data from the keyboard, the time between keystrokes is very long in terms of CPU cycles. Many things can be accomplished by the computer during this time, such as printing a report. Even during the printing of a report, time is still available for additional operations such as background updating of a clock/calendar display. Even so, there is almost always spare time when the CPU is not being used. If the computer is turned off or slowed down during this spare time, then power consumption is obtained real-time. Reduced power consumption in the CPU means that less heat is dissipated in the CPU. Less heat dissipated in the CPU translates into a lower CPU temperature than would exist in the CPU without reducing the power consumption. An additional benefit of lowering the power consumption is extended battery operation.

According to one embodiment of the present invention, to lower CPU temperature through power conservation under MS-DOS, as well as other operating systems such as OS/2, UNIX, and those for Apple computers, requires a combination of hardware and software. It should be noted that because the present invention will work in any system, while the implementation may vary slightly on a system-by-system basis, the scope of the present invention should therefore not be limited to computer systems operating under MS/DOS or Windows.

Slowing down or stopping computer system components reduces power consumption thereby lowering CPU temperature over what it would without such slowing down or stopping, although the amount of power saved and CPU temperature reduction may vary. Therefore, according to the present invention, stopping the clock (where possible as some CPUs cannot have their clocks stopped) reduces power consumption and CPU temperature more than just slowing the clock.

In general, the number of operations (or instructions) per second may be considered to be roughly proportional to the processor clock:

instructions/second=instructions/cycle*cycles/second

Assuming for simplicity that the same instruction is repeatedly executed so that instructions/second is constant, the relationship can be expressed as follows:

$Fq = K_1 * Clk$ where Fq is instructions/second, $K_1$ is constant equal to the instructions/cycle, and Clk equals cycles/second. Thus, roughly speaking, the rate of execution increases with the frequency of the CPU clock.

The amount of power being used at any given moment is also related to the frequency of the CPU clock and therefore to the rate of execution. In general this relationship can be expressed as follows:

$P = K_2 + (K_3 * Clk)$ where P is power in watts, $K_2$ is a constant in watts, $K_3$ is a constant and expresses the number of watt-second/cycle, and Clk equals the cycles/second of the CPU clock. Thus it can also be said that the amount of power being consumed at any given time increases as the CPU clock frequency increases.

Assume that a given time period T is divided into N intervals such that the power P is constant during each interval. Then the amount of energy E expended during T is given by:

$E = P(1)\text{delta } T_1 + P(2)\text{delta } T_2 \ldots P(N)\text{delta } T_N$ Further assume that the CPU clock "CLK" has only two states, either "ON" or "OFF". For the purposes of this discussion, the "ON" state represents the CPU clock at its maximum frequency, while the "OFF" state represents the minimum clock rate at which the CPU can operate (this may be zero for CPUs that can have their clocks stopped). For the condition in which the CPU clock is always "ON", each P(i) in the previous equation is equal and the total energy is:

$E(\max) = P(\text{on}) * (\text{delta } T_1 + \text{delta } T_2 \ldots \text{delta } T_N) = P(\text{on}) * T$ This represents the maximum power consumption of the computer in which no power conservation measures are being used. If the CPU clock is "off" during a portion of the intervals, then there are two power levels possible for each interval. The P(on) represents the power being consumed when the clock is in its "ON" state, while P(off) represents the power being used when the clock is "OFF". If all of the time intervals in which the clock is "ON" are summed into the quantity "T(on)" and the "OFF" intervals are summed into "T(off)", then it follows:

$T = T(\text{on}) + T(\text{off})$

Now the energy being used during period T can be written:

$E = [P(\text{on}) * T(\text{on})] + [P(\text{off}) * T(\text{off})]$

Under these conditions, the total energy consumed may be reduced, thereby reducing CPU generated heat, by increasing the time intervals T(off). Thus, by controlling the periods of time the clock is in its "OFF" state, the amount of energy being used may be reduced. If the T(off) period is divided into a large number of intervals during the period T, then as the width of each interval goes to zero, energy consumption is at a maximum. Conversely, as the width of the T(off) intervals increase, the energy consumed decreases.

If the "OFF" intervals are arranged to coincide with periods during which the CPU is normally inactive, then the user cannot perceive any reduction in performance and overall energy consumption is reduced from the E(max) state. In order to align the T(off) intervals with periods of CPU inactivity, the CPU activity and temperature levels are used to determine the width of the T(off) intervals in a closed loop. FIG. 1 depicts such a closed loop. The activity level of the CPU is determined at Step 10. If CPU temperature is not a concern (Step 12), the activity level of the CPU is again determined (Step 10). If CPU temperature is a concern, a determination is made (Step 14) as to whether or not critical I/O is being performed. If critical I/O is being performed, the present invention increases the T(off) interval (Step 20) and returns to determine the activity level of the CPU again. If, on the other hand, critical I/O is not being performed, the present invention decreases the T(off) interval (Step 30) and proceeds to again determine the activity level of the CPU. Thus the T(off) intervals are constantly being adjusted to match the system activity level and control the temperature level of the CPU.

Management of CPU temperature (thermal management) is necessary because CPUs are designed to operate within a specific temperature range. CPU performance and speed deteriorate when the specified high operating temperature of a CPU is exceeded (especially in CMOS process CPUs where temperatures above the high operating temperature translate into slower CPU speed). The heat output of a CPU is directly related to the power consumed by the CPU and heat it absorbs from devices and circuitry that immediately surround it. CPU power consumption increases with CPU clock speed and the number of instructions per second to be performed by the CPU. As a result, heat related problems are becoming more common as faster and increasingly complex CPUs are introduced and incorporated into electronic devices.

In any operating system, two key logic points exist: an IDLE, or "do nothing", loop within the operating system and an operating system request channel, usually available for services needed by the application software. By placing logic inline with these logic points, the type of activity request made by an application software can be evaluated, thermal management can be activated and slice periods determined. A slice period is the number of T(on) vs. T(off) intervals over time, computed by the CPU activity and thermal levels. An assumption may be made to determine CPU activity level: Software programs that need service usually need additional services and the period of time between service requests can be used to determine the activity level of any application software running on the computer and to provide slice counts for power conservation according to the present invention. Another assumption that may be made is that each CPU has a temperature coefficient unique to that CPU—CPU temperature rise time, CPU maximum operating temperature, CPU temperature fall time and intervention time required for thermal control. If this information is not provided by the CPU manufacturer, testing of the CPU being used (or another of the same make and type tested under similar conditions) is required to obtain accurate information.

Once the CPU is interrupted during a thermal management slice (T(off)), the CPU will save the interrupted routine's state prior to vectoring to the interrupt software. Off course, since the thermal management software was operating during this slice, control will be returned to the active power conservation and thermal management loop (monitor 40) which simply monitors the CPU's clock to determine an exit condition for the thermal management mode thereby exiting from T(off) to T(on) state. The interval of the next thermal management state is adjusted by the activity level monitor, as discussed above in connection with FIG. 1. Some implementations can create an automatic exit from T(off) by the hardware logic, thereby forcing the thermal management loop to be exited automatically and executing an interval T(on).

Figure 2A:
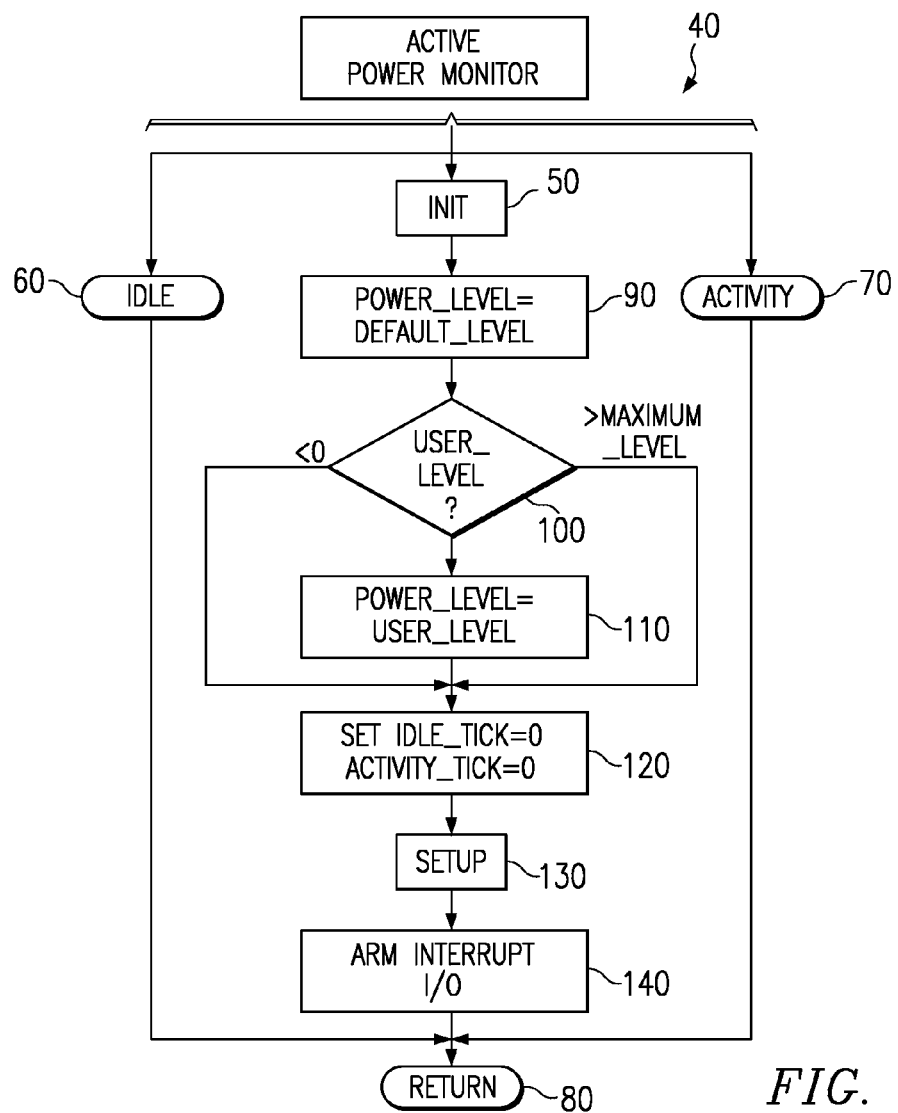
FIGS. 2a-2d are flowcharts depicting the active power conservation monitor employed by the present invention.
Figure 2B:
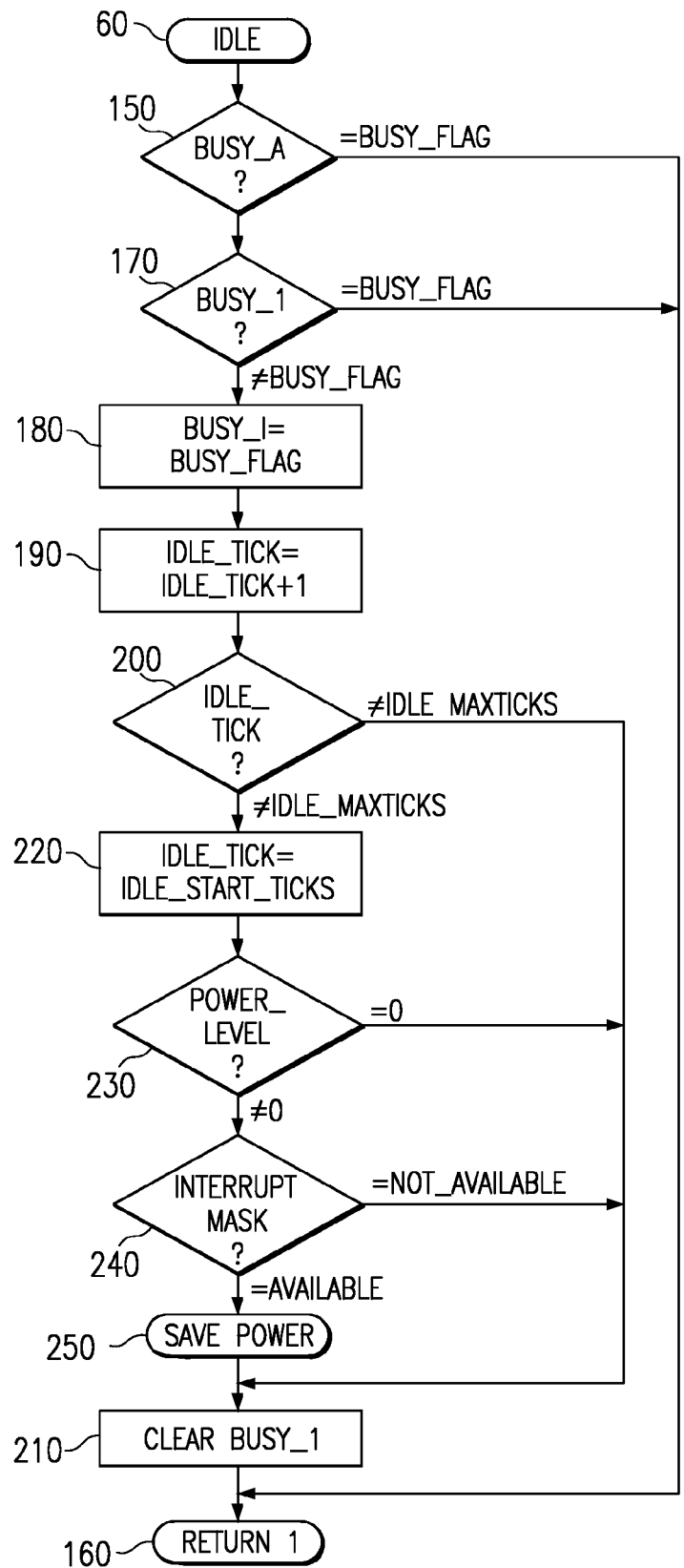
Figure 2C:
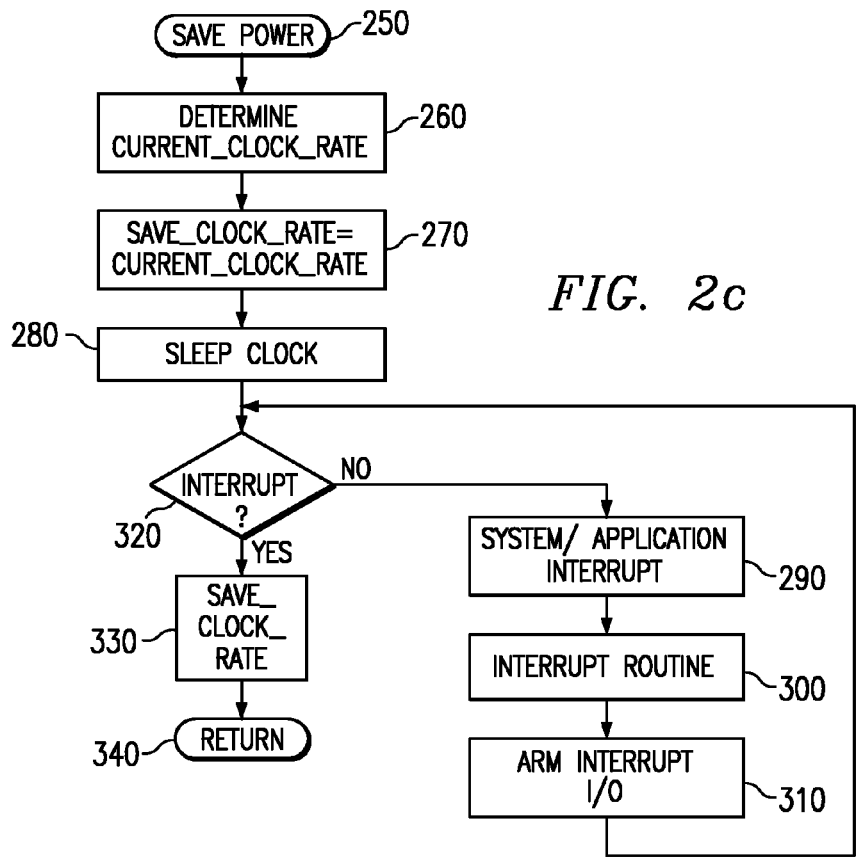
Figure 2D:
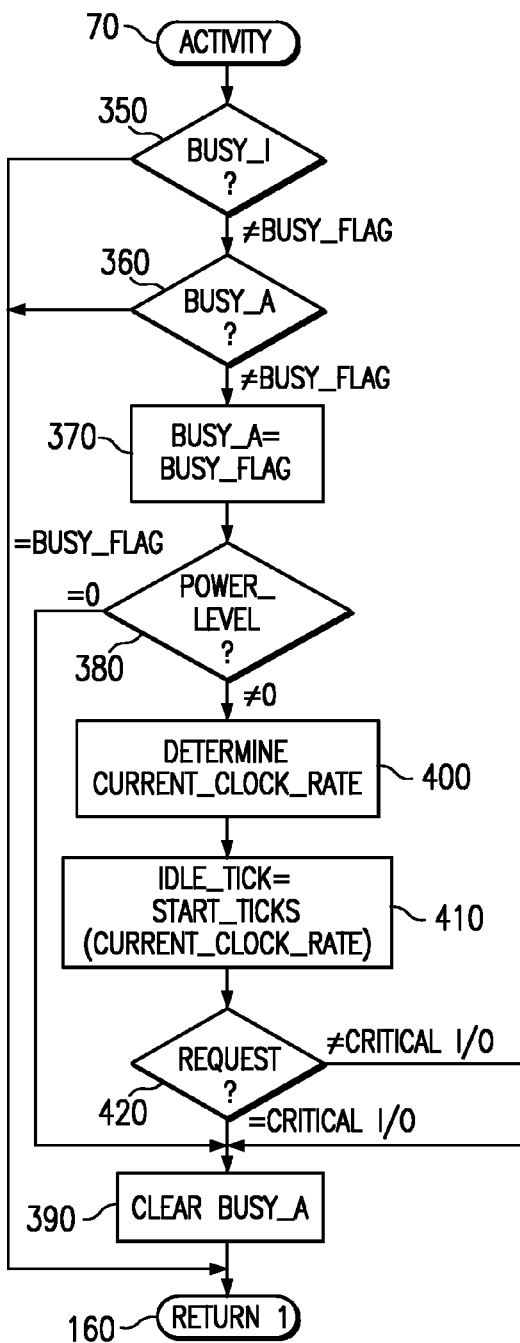
Figure 2D:
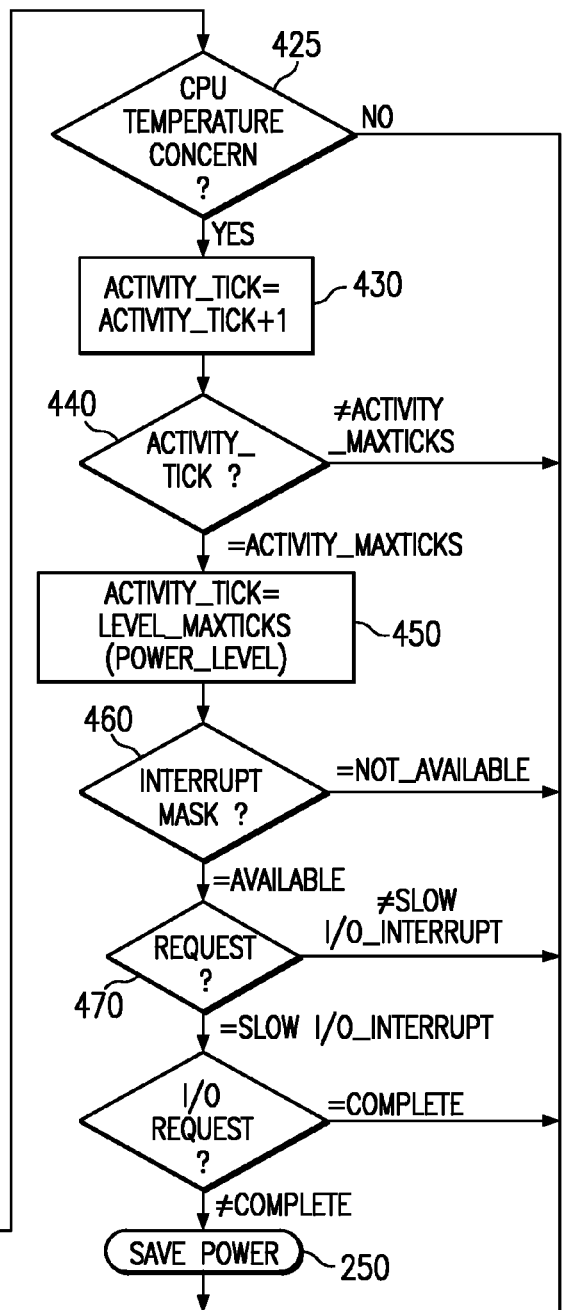

More specifically, looking now at FIGS. 2*a*-2*d*, which depict the thermal management monitor 40 of the present invention. The CPU installs monitor 40 either via a program stored in the CPU ROM or loads it from an external device storing the program in RAM. Once the CPU has loaded monitor 40, it continues to INIT 50 for system interrupt initialization, user configurational setup, and system/application specific initialization. IDLE branch 60 (more specifically set out in FIG. 2*b*) is executed by a hardware or software interrupt for an IDLE or "do nothing" function. This type of interrupt is caused by the CPU entering either an IDLE or a "do nothing" loop (i.e., planned inactivity). The ACTIVITY branch 70 of the flow chart, more fully described below in relation to FIG. 2*d*, is executed by a software or hardware interrupt due to an operating system or I/O service request, by an application program or internal operating system function. An I/O service request made by a program may, for example, be a disk I/O, read, print, load, etc. Regardless of the branch selected, control is eventually returned to the CPU operating system at RETURN 80. The INIT branch 50 of this flowchart, shown in FIG. 2*a*, is executed only once if it is loaded via program into ROM or is executed every time during power up if it is loaded from an external device and stored in the RAM. Once this branch of active thermal management monitor 40 has been fully executed, whenever control is yielded from the operating system to the thermal management mode, either IDLE 60 or ACTIVITY 70 branches are selected depending on the type of CPU activity: IDLE branch 60 for power conservation (and indirect thermal management) during planned inactivity and ACTIVITY branch 70 for active thermal management during CPU activity.

Looking more closely at INIT branch 50, after all system interrupt and variables are initialized, the routine continues at Step 90 to set the Power_level equal to DEFAULT_LEVEL. In operating systems where the user has input control for the Power_level, the program at Step 100 checks to see if a User_level has been selected. If the User_level is less than zero or greater than the MAXIMUM_LEVEL, the system uses the DEFAULT_LEVEL. Otherwise, it continues onto Step 110 where it modifies the Power_level to equal the User_level.

According to the preferred embodiment of the present invention, the system at Step 120 sets the variable Idle_tick to zero and the variable Activity_tick to zero. Under an MS/DOS implementation. Idle_tick refers to the number of interrupts found in a "do nothing" loop. Activity_tick refers to the number of interrupts caused by an activity interrupt which in turn determines the CPU activity level. Tick count represents a delta time for the next interrupt. Idle_tick is a constant delta time from one tick to another (interrupt) unless overwritten by a software interrupt. A software interrupt may reprogram delta time between interrupts.

After setting the variables to zero, the routine continues on to Setup 130 at which time any application specific configuration fine-tuning is handled in terms of system-specific details and the system is initialized. Next the routine arms the interrupt I/O (Step 140) with instructions to the hardware indicating the hardware can take control at the next interrupt. INIT branch 50 then exits to the operating system, or whatever called the thermal management monitor originally, at RETURN 80.

Consider now IDLE branch 60 of active thermal management monitor 40, more fully described at FIG. 2*b*. In response to a planned inactivity of the CPU, monitor 40 (not specifically shown in this Figure) checks to see if entry into IDLE branch 60 is permitted by first determining whether the activity interrupt is currently busy. If Busy_A equals BUSY_FLAG (Step 150), which is a reentry flag, the CPU is busy and cannot now be put to sleep. Therefore, monitor 40 immediately proceeds to RETURN I 160 and exits the routine. RETURN I 160 is an indirect vector to the previous operating system IDLE vector interrupt for normal processing stored before entering monitor 40. (I.e., this causes an interrupt return to the last chained vector.)

If the Busy_A interrupt flag is not busy, then monitor 40 checks to see if the Busy_Idle interrupt flag, Busy_I, equals BUSY_FLAG (Step 170). If so, this indicates the system is already in IDLE branch 60 of monitor 40 and therefore the system should not interrupt itself. If Busy_I=BUSY_FLAG, the system exits the routine at RETURN_I indirect vector 160.

If, however, neither the Busy_A reentry flag or the Busy_I reentry flag have been set, the routine sets the Busy_I flag at Step 180 for reentry protection (Busy_I=BUSY_FLAG). At Step 190 Idle_tick is incremented by one. Idle_tick is the number of T(on) before a T(off) interval and is determined from IDLE interrupts, setup interrupts and from CPU activity and temperature levels. Idle_tick increments by one to allow for smoothing of events, thereby letting a critical I/O activity control smoothing.

At Step 200 monitor 40 checks to see if Idle_tick equals IDLE_MAXTICKS. IDLE_MAXTICKS is one of the constants initialized in Setup 130 of INIT branch 50, remains constant for a system, and is responsible for self-tuning of the activity and thermal levels. If Idle_tick does not equal IDLE_MAXTICKS, the Busy_I flag is cleared at Step 210 and exits the loop proceeding to the RETURN I indirect vector 160. If, however, Idle_tick equals IDLE_MAXTICKS, Idle_tick is set equal to IDLE_START_TICKS (Step 220). IDLE_START_TICKS is a constant which may or may not be zero (depending on whether the particular CPU can have its clock stopped). This step determines the self-tuning of how often the rest of the sleep functions may be performed. By setting IDLE_START_TICKS equal to IDLE_MAXTICKS minus one, a continuous T(off) interval is achieved. At Step 230, the Power_level is checked. If it is equal to zero, the monitor clears the Busy_I flag (Step 210), exits the routine at RETURN I 160, and returns control to the operating system so it may continue what it was originally doing before it entered active thermal management monitor 40.

If, however, the Power_level does not equal zero at Step 240, the routine determines whether an interrupt mask is in place. An interrupt mask is set by the system/application software, and determines whether interrupts are available to monitor 40. If interrupts are NOT_AVAILABLE, the Busy_I reentry flag is cleared and control is returned to the operating system to continue what it was doing before it entered monitor 40. Operating systems, as well as application software, can set T(on) interval to yield a continuous T(on) state by setting the interrupt mask equal to NOT_AVAILABLE.

Assuming an interrupt is AVAILABLE, monitor 40 proceeds to the SAVE POWER subroutine 250 which is fully executed during one T(off) period established by the hardware state. (For example, in the preferred embodiment of the present invention, the longest possible interval could be 18 ms, which is the longest time between two ticks or interrupts from the real-time clock.) During the SAVE POWER subroutine 250, the CPU clock is stepped down to a sleep clock level.

Once a critical I/O operation forces the T(on) intervals, the IDLE branch 60 interrupt tends to remain ready for additional critical I/O requests. As the CPU becomes busy with critical I/O, less T(off) intervals are available. Conversely, as critical I/O requests decrease, and the time intervals between them increase, more T(off) intervals are available. IDLE branch 60 is a self-tuning system based on feedback from CPU activity and temperature interrupts and tends to provide more T(off) intervals as CPU temperature becomes a concern. As soon as monitor 40 has completed SAVE POWER subroutine 250, shown in FIG. 2c and more fully described below, the Busy_I reentry flag is cleared (Step 210) and control is returned at RETURN I 160 to whatever operating system originally requested monitor 40.

Consider now FIG. 2c, which is a flowchart depicting the SAVE POWER subroutine 250. Monitor 40 determines what the I/O hardware high speed clock is at Step 260. It sets the CURRENT_CLOCK_RATE equal to the relevant high speed clock and saves this value to be used for CPUs with multiple level high speed clocks. Thus, if a particular CPU has 12 MHz and 6 MHz high speed clocks, monitor 40 must determine which high speed clock the CPU is at before monitor 40 reduces power so it may reestablish the CPU at the proper high speed clock when the CPU awakens. At Step 270, the Save_clock_rate is set equal to the CURRENT_CLOCK_RATE determined. Save_clock_rate 270 is not used when there is only one high speed clock for the CPU. Monitor 40 now continues to SLEEPCLOCK 280, where a pulse is sent to the hardware selector (shown in FIG. 3) to put the CPU clock to sleep (i.e., lower or stop its clock frequency). The I/O port hardware sleep clock is at much lower oscillations than the CPU clock normally employed.

At this point either of two events can happen. A system/application interrupt may occur or a real-time clock interrupt may occur. If a system/application interrupt 290 occurs, monitor 40 proceeds to interrupt routine 300, processing the interrupt as soon as possible, arming interrupt I/O at Step 310, and returning to determine whether there has been an interrupt (Step 320). Since in this case there has been an interrupt, the Save_clock_rate is used (Step 330) to determine which high speed clock to return the CPU to and SAVE POWER subroutine 250 is exited at RETURN 340. If, however, a system/application interrupt is not received, the SAVE POWER subroutine 250 will continue to wait until a real-time clock interrupt has occurred (Step 320). Once such an interrupt has occurred, SAVE POWER subroutine 250 will continue to wait until a real-time clock interrupt has occurred (Step 320). Once such an interrupt has occurred, SAVE-POWER subroutine 250 will execute interrupt loop 320 several times. If however, control is passed when the sleep clock rate was zero, in other words, there was no clock, the SAVE POWER subroutine 250 will execute interrupt loop 320 once before returning the CPU clock to the Save_clock_rate 330 and exiting (Step(340)).

Consider now FIG. 2d which is a flowchart showing ACTIVITY branch 70 triggered by an application/system activity request via an operating system service request interrupt. ACTIVITY branch 70 begins with reentry protection. Monitor 40 determines at Step 350 whether Busy_I has been set to BUSY_FLAG. If it has, this means the system is already in ACTIVITY branch 70 and cannot be interrupted. If Busy_I=BUSY_FLAG, monitor 40 exits to RETURN I 160, which is an indirect vector to an old activity vector interrupt for normal processing, via an interrupt vector after the operating system performs the requested service.

If however, the Busy_I flag does not equal BUSY_FLAG, which means ACTIVITY branch 70 is not being accessed, monitor 40 determines at Step 360 if the BUSY_A flag has been set equal to BUSY_FLAG. If so, control will be returned to the system at this point because ACTIVITY branch 70 is already being used and cannot be interrupted. If the Busy_A flag has not been set, in other words, Busy_A does not equal BUSY_FLAG, monitor 40 sets Busy_A equal to BUSY_FLAG at Step 370 so as not to be interrupted during execution of ACTIVITY branch 70. At Step 380 the Power_level is determined. If Power_level equals zero, monitor 40 exits ACTIVITY branch 70 after clearing the Busy_A reentry flag (Step 390). If however, the Power_level does not equal zero, the CURRENT_CLOCK_RATE of the I/O hardware is next determined. As was true with Step 270 of FIG. 2C, Step 400 of FIG. 2d uses the CURRENT_CLOCK_RATE if there are multiple level high speed clocks for a given CPU. Otherwise, CURRENT_CLOCK_RATE always equals the CPU high speed clock. After the CURRENT_CLOCK_RATE is determined (step 400), at Step 410 Idle_tick is set equal to the constant START_TICKS established for the previously determined CURRENT_CLOCK_RATE. T(off) intervals are established based on the current high speed clock that is active.

Monitor 40 next determines that a request has been made. A request is an input by the application software running on the computer, for a particular type of service needed. At Step 420, monitor 40 determines whether the request is a CRITICAL I/O. If the request is a CRITICAL I/O, it will continuously force T(on) to lengthen until the T(on) is greater than the T(off), and monitor 40 will exit ACTIVITY branch 70 after clearing the Busy_A reentry flag (Step 390). If the request is not a CRITICAL I/O and if CPU temperature is not a concern (Step 425), monitor 40 will continuously force T(on) to lengthen until the T(on) is greater than the T(off), and monitor 40 will exit ACTIVITY branch 70 after clearing the Busy_A reentry flag (Step 390). If, however, the request is not a CRITICAL I/O and if CPU temperature is not a concern, then the Activity_tick is incremented by one at Step 430. It is then determined at Step 440 whether the Activity_tick now equals ACTIVITY_MAXTICKS. Step 440 allows a smoothing from a CRITICAL I/O, and makes the system ready from another CRITICAL I/O during Activity_tick T(on) intervals. Assuming Activity_tick does not equal ACTIVITY_MAXTICKS, ACTIVITY branch 70 is exited after clearing the Busy_A reentry flag (Step 390). If, on the other hand, the Activity_tick equals constant ACTIVITY_MAXTICKS, at Step 450 Activity_tick is set to the constant LEVEL_MAXTICKS established for the particular Power_level determined at Step 380.

Now monitor 40 determines whether an interrupt mask exists (Step 460). An interrupt mask is set by system/application software. Setting it to NOT_AVAILABLE creates a continuous T(on) state. If the interrupt mask equals NOT_AVAILABLE, there are no interrupts available at this time and monitor 40 exits ACTIVITY branch 70 after clearing the Busy_A reentry flag (Step 390). If, however, an interrupt is AVAILABLE, monitor 40 determines at Step 470 whether the request identified at Step 420 was for a SLOW I/O_INTERRUPT. Slow I/O requests may have a delay until the I/O device becomes "ready". During the "make ready" operation, a continuous T(off) interval may be set up and executed to conserve power. Thus, if the request is not a SLOW I/O_INTERRUPT, ACTIVITY branch 70 is exited after clearing the Busy_A reentry flag (Step 390). If, however, the request is a SLOW I/O_INTERRUPT, and time yet exists before the I/O device becomes "ready", monitor 40 then determines at Step 480 whether the I/O request is COMPLETE (i.e., is I/O device ready?). If the I/O device is not ready, monitor 40 forces T(off) to lengthen, thereby forcing the CPU to wait, or sleep, until the SLOW I/O device is ready. At this point it has time to save power, and ACTIVITY branch 70 enters SAVE POWER subroutine 250 previously described in connection with to FIG. 2C. If, however, the I/O request is COMPLETE, control is returned to the operating system subsequently to monitor 40 exiting ACTIVITY branch 70 after clearing Busy_A reentry flag (Step 390).

Self-tuning is inherent within the control system of continuous feedback loops. The software of the present invention can detect CPU activity and activate the power conserving thermal management aspect of the present invention when CPU temperature is high enough to be of concern. In one embodiment of the invention, the power conserving thermal management software monitors a thermistor on a PWB board adjacent the CPU. The monitoring is performed at a selected frequency (such as 18 times/sec) through an A/D converter. Alternatively, the monitoring frequency can be changed as desired to suit the need and the thermistor can be mounted directly on or in the CPU if the CPU includes a thermistor, rather than being placed on the PWB board. If no power is being conserved and the temperature of the thermistor is within acceptable parameters, then monitoring continues at the same rate. If, however, the temperature of the thermistor is rising, a semaphore is set to tell the system to start watching CPU temperature for possible thermal management action. Each CPU has a temperature coefficient unique to that specific CPU. Information on CPU temperature rise time and at what point intervention must occur to prevent performance degradation must be derived from information supplied with the specific CPU or through testing.

According to one embodiment of the invention, a counter is set in hardware to give an ad hoc interrupt (counter is based on coefficient of temperature rise). The thermal management system must know how long it takes CPU temperature to go down to minimize temperature effect. If the counter is counting down and receives an active power interrupt, the ad hoc interrupt is turned off because control has been regained through the active power and thermal management. The result is unperceived operational power savings and a corresponding reduction in the amount of heat that would otherwise be generated by the CPU. The ad hoc interrupt can be overridden or modified by the active power interrupt which checks the type gradient i.e., up or down, checks the count and can adjust the up count and down count ad hoc operation based on what the CPU is doing real time. If there are no real time interrupts, then the timer interval continually comes in and monitors the gradual rise in temperature and it will adjust the ad hoc counter as it needs it up or down. The result is dynamic feedback from the active thermal management into the ad hoc timer, adjusting it to the dynamic adjustment based on what the temperature rise or fall is at any given time and how long it takes for that temperature to fall off or rise through the danger point. This is a different concept that just throwing a timer out ad hoc and letting it run.

For example, assume that the CPU being used has a maximum safe operating temperature of 95 degrees C. (obtained from the CPU spec sheet or from actual testing). Assume also that a thermistor is located adjacent the CPU and that when the CPU case is at 95 degrees C., the temperature of the thermistor may be lower (such as 57 degrees C.) since it is spaced a distance from the CPU. A determination should be made as to how long it took the CPU to reach 95 degrees. If it took an hour, the system may decide to sample the thermistor every 45 minutes. Once the CPU is at 95 degrees, CPU temperature may need to be sampled every minute (or multiple times a minute) to make sure the temperature is going down, otherwise, the temperature might rise above the maximum safe operating temperature. If 5 minutes are required to raise CPU temperature from 95 to 96 degrees, CPU temperature sampling must be at a period less than 5 minutes—i.e., every 3 or 1 minutes. If the temperature is not going down, then the length of the rest cycles should be increased. Continual evaluation of the thermal read constant is key to knowing when CPU temperature is becoming a problem, when thermal management intervention is appropriate and how much time can be allowed for other things in the system. This decision must be made before the target temperature is reached. Once CPU temperature starts to lower, it is O.K. to go back to the regular thermal constant number because 1) you have selected the right slice period, or 2) the active power portion of the active thermal management has taken over, so the sampling rate can be reduced.

Examples of source code that can be stored in the CPU ROM or in an external RAM device, according to one embodiment of the invention, are listed in the COMPUTER PROGRAMS LISTING section under: 1).ASM—Interrupt 8 Timer interrupt service—listed on pages 32 to 37; 2) CPU Sleep Routine—listed on page 38; 3) FILE=FORCE5.ASM—listed on pages 39 to 43; and 4) FILE=Thermal.EQU—listed on page 44.

Utilizing the above listed source code, and assuming that Interrupt 8 Timer interrupt service is the interrupt mask called at Step 240 of IDLE loop 60 or at Step 460 of ACTIVITY loop 70, the procedure for thermal management is set up "Do Thermal Management if needed" after which the system must decide if there is time for thermal management "Time for Thermal Management?". If there is time for thermal management, the system calls the file "force_sleep" if there is time to sleep (which also sleeps any device receiving the same clock signal and which device is coupled to a PCI bus coupled to the CPU), or alternatively, could do a STI nop and a halt—which is an alternate way and does not get PCI devices and does not have a feedback loop from the temperature management systems. The "force_sleep" file gets feedback from other power systems. Force_sleep does a jump to force5.asm, which is the PCI multiple sleep program. Are there speakers busy in the system? Is there something else in the system going on from a power management point of view? Are DMAs running in the system? Sleeping may not be desirable during a sound cycle. It needs to know what is going on in the system to do an intelligent sleep. The thermal management cares about the CPU and cares about all the other devices out there because collectively they all generate heat.

There are some equations in the program that are running—others that may or may not be running. "tk" is the number of interrupts per second that are sampled times the interval that is sampled over. "it" represents a thermal read constant and the thermal read constant in the present embodiment is 5. In the code, the thermal read constant is dynamically adjusted later depending on what the temperature is. Thus, this is the starting thermal read interval, but as the temperature rises, reading should be more often and the cooler it is, reading should be less often than 5 minutes—e.g., 10 minutes. The thermal read constant will adjust. TP1 or TP2 represents what percentage of the CPU cycles we want to sample at—for example, TP7 set at 50=the number of interrupts that have to occur over some period of time such that if we take that number that going to represent every so many clock cycles that go by before we sample and sleep the CPU. These equations are variable. Other equations can also be used.

Examples of source code that can be stored in the CPU ROM or in an external RAM device, according to another embodiment of the invention, are listed in the COMPUTER PROGRAMS LISTING section under: 5) BA.ASM—Interrupt 8 Timer interrupt service—listed on pages 45 to 50, which replaces 1).ASM—Interrupt 8 Timer interrupt service—listed on pages 32 to 37; and 6) Trange.INC—listed on pages 51 to 59, which replaces 4) FILE=Thermal.EQU—listed on page 44.

This embodiment of the invention interfaces with Windows, Battery Pro, DOS and other systems. 5) BA.ASM which is a stripped down version of 1).ASM. Newly include changes include a technique for looking at the power switch activity, to see whether or not it is on intelligent power management, and playing with system run time for old state and New state to tell between battery changes. The New program also performs a thermal management loop or PC change suspend when there has been a change in state of the battery. Part of this activity includes the checking of busy flags. As a result, this embodiment of the invention provides for some different things than the previous embodiment of the invention depending on where the temperature transition occurs. This embodiment of the invention is preferred in a Windows implementation.

New BA.ASM is coupled with a New program called Trange.INC. Trange.INC has a task called "Do Thermal Management". The thermal management reads data from the keyboard controller and it keeps a down count as to how often it is looking at things, such as CPU relevant system temperature. First, the thermal management determines what the CPU relevant temperature is. Next, it determines what direction the temperature is moving—up, down, oscillating or staying the same. These four temperature directions are categorized as: 00, 01, 10, 11. The thermal management the makes some predictions dependent on whether the temperature value is going up, down, oscillating or staying the same. Trange. INC provides for eight temperature zones. It also provides different time constants and temperature grades and amounts of action and time it takes to get the temperature down. As an example, the thermal management asks whether the temperature is oscillating? If oscillating, the system is designed to stop the oscillating and stabilizing the temperature or to reduce the temperature. To this, the system sets the temperature level up by one—jump to the next zone and assume that the system needs more cooling to bring the temperature down. This pushing up the temperature into a higher zone is an attempt to bring the temperature down.

The thermal management also determines what direction the temperature is going. Next, it computes what the temperature was the last read versus where it is this read. As an example, if the system kNew it was in zone 3 last time and temperature was constant, now, the system is in zone 4, the temperature must be increasing. On the other hand, if the temperature was in zone 4 last time and temperature was increasing and now, the system is in zone 3, and temperature is decreasing, the result is oscillating temperature. If the system was in zone 4 last time and temperature was constant and now in zone 4 and temperature constant, the result is constant temperature. But if the system was in zone 4 last time and now in zone 5, temperature must be increasing. The system compares previous readings against current readings to determine the temperature direction. Increments or decrements in the zone levels are made depending on what the temperature direction is to control the system temperature. If the temperature is too high, the system slows down the CPU. There is a lot of New logic in 6) Trange.INC. As an example, "TDozeTable [bx]" determines what zone the temperature is in and depending upon the zone, determines how many ticks are to be used. There are different ticks for different configurations.

The "Do Thermal Management" loop first goes and gets the CPU relevant temperature, then it computes the direction of the temperature, puts up the tick counts for later usage (e.g. how many times you need to slice to bring down the temperature). Getting the temperature is relatively simple, the system goes out and reads the value from a keyboard controller, from an A/D converter, etc. If an A/D converter is used, the equations in the program convert an A/D value over to some value of temperature based on a gradient, which is a little different for every system. Theoretically, you can normalize the gradient for any system if there are enough characterizations. As an example, in the program, the temperature of a Toshiba Case is measured against the temperature of the present system to compare the difference (37 degrees celsius versus the 37.25 degree celsius reading of the present system—as a result, any system can be benchmarked other systems in order to normalize the temperature gradient). Each of the zones has a corresponding temperature range. There are a series of tables in the program for computations that select the number of ticks are to be used to sleep the processor. An advantage of this embodiment of the invention is that it facilitates predictions of temperature zones when the temperature is increasing, decreasing, oscillating or stable. This facilitates table action or implements additional action by the system. The feed back loop in this embodiment has more intelligence in predicting temperature changes from previous readings that is available in the previous embodiment of the invention. This embodiment also has intelligence about zoning and temperature direction which facilitates accelerated or decelerated temperature control. Moreover, the slice values are calculated from measured temperatures (in the zone values) as compared with simply determining slice values from a table.

Thus, one concept of the present invention is that there are various levels of temperature that require testing in relationship to the hottest point to be managed. The sample period will change based on temperature and active feedback. Active feedback may be required even though thermal management has determined that the CPU temperature is too high and should be reduced (by slowing or stopping the CPU clock). CPU clock speed may not be reduced because other system things are happening—the result is intelligent feedback. The power conserving thermal management system asks the CPU questions such as are you doing something now that I cannot go do? If not, please sleep. If yes, don't sleep and come back to me so that I can reset my count. The result is a graduated effect up and graduated effect down and the thermal read constant time period adjusts itself in response to CPU temperature. Performance taken away from the user during power conservation and thermal management control is balanced against critical I/O going on in the system.

Existing thermal management systems turn on and stay on until the CPU temperature goes down. Unfortunately, this preempts things in the system. Such is not the case in the environment of the present invention. The same sleep manager has global control. As an example, while CPU temperature may be rising or have risen to a level of concern, the system may be processing critical I/O, such as a wave file being played. With critical I/O, the system of the present invention will play the wave file without interruption even though the result may be a higher CPU temperature. CPUs do not typically overheat all at once. There is a temperature rise gradient. The system of the present invention takes advantage of the temperature rise gradient to give a user things that affect the user time slices and take it away from him when its not affected.

Thermal management can be also be achieved using a prediction mode. Prediction mode utilizes no sensors or thermistors or even knowledge as to actual CPU temperature. Prediction mode uses a guess—i.e. that the system will need the ad hoc interrupt once every 5 seconds or 50 times/second (=constant) and then can take it up or down based on what the system is doing with the active power and thermal management. The prediction theory can also be combined with actual CPU temperature monitoring.

Once the power conserving thermal management monitor is activated, a prompt return to full speed CPU clock operation within the interval is achieved so as to not degrade the performance of the computer. To achieve this prompt return to full speed CPU clock operation, the preferred embodiment of the present invention employs some associated hardware.

Figure 3:
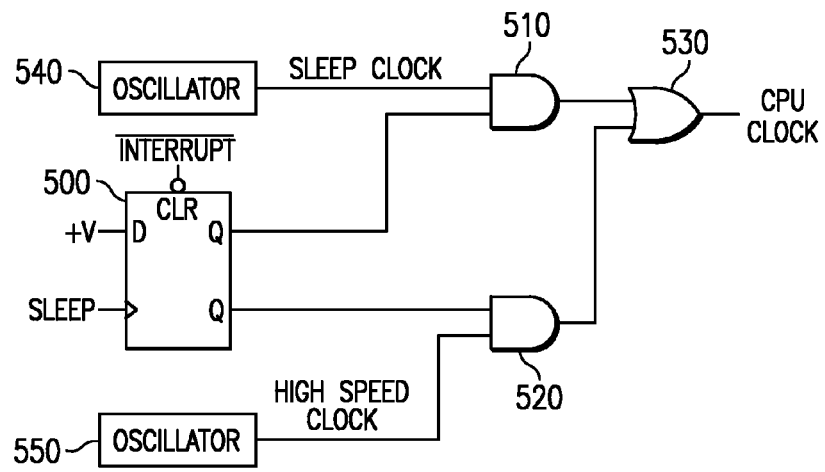
FIG. 3 is a simplified schematic diagram representing the active power conservation associated hardware employed by the present invention.

Looking now at FIG. 3 which shows a simplified schematic diagram representing the associated hardware employed by the present invention for active thermal management. When monitor 40 (not shown) determines the CPU is ready to sleep, it writes to an I/O port (not shown) which causes a pulse on the SLEEP line. The rising edge of this pulse on the SLEEP line causes flip flop 500 to clock a high to Q and a low to Q_. This causes the AND/OR logic (AND gates 510, 520, OR gate 530) to select the pulses travelling the SLEEP CLOCK line from SLEEP CLOCK oscillator 540 to be sent to and used by the CPU CLOCK. SLEEP CLOCK oscillator 540 is a slower clock than the CPU clock used during normal CPU activity. The high coming from the Q of flip flop 500 ANDed (510) with the pulses coming from SLEEP CLOCK oscillator 540 is ORed (530) with the result of the low on the Q_ of flip flop 500 ANDed (520) with the pulse generated along the HIGH SPEED CLOCK line by the HIGH SPEED CLOCK oscillator 550 to yield the CPU CLOCK. When the I/O port designates SLEEP CLOCK, the CPU CLOCK is then equal to the SLEEP CLOCK oscillator 540 value. If, on the other hand, an interrupt occurs, an interrupt-value clears flip flop 500, thereby forcing the AND/OR selector (comprising 510, 520 and 530) to choose the HIGH SPEED CLOCK value, and returns the CPU CLOCK value to the value coming from HIGH SPEED CLOCK oscillator 550. Therefore, during any power conserving thermal management operation on the CPU, the detection of any interrupt within the system will restore the CPU operation at full clock rate prior to vectoring and processing the interrupt.

It should be noted that the associated hardware needed, external to each of the CPUs for any given system, may be different based on the operating system used, whether the CPU can be stopped, etc. Nevertheless, the scope of the present invention should not be limited by possible system specific modifications needed to permit the present invention to actively manage CPU temperature through power conservation in the numerous available portable computer systems. For example two actual implementations are shown in FIGS. 4 and 5, discussed below.

Many VSLI designs today allow for clock switching of the CPU speed. The logic to switch from a null clock or slow clock to a fast clock logic is the same as that which allows the user to change speeds by a keyboard command. The added logic of monitor 40 working with such switching logic, causes an immediate return to a fast clock upon detection of any interrupt. This simple logic is the key to the necessary hardware support to interrupt the CPU and thereby allow the processing of the interrupt at full speed.

The method to reduce power consumption under MS-DOS employs the MS-DOS IDLE loop trap to gain access to the "do nothing" loop. The IDLE loop provides special access to application software and operating system operations that are in a state of IDLE of low activity. Careful examination is required to determine the activity level at any given point within the system. Feedback loops are used from the interrupt 21H service request to determine the activity level. The prediction of activity level is determined by interrupt 21H requests, from which the present invention thereby sets the slice periods for "sleeping" (slowing down or stopping) the CPU. An additional feature allows the user to modify the slice depending on the activity level of interrupt 21H. The method to produce power conservation under WINDOWS employs real and protect modes to save the power interrupt which is called by the operating system each time WINDOWS has nothing to do.

Figure 4:
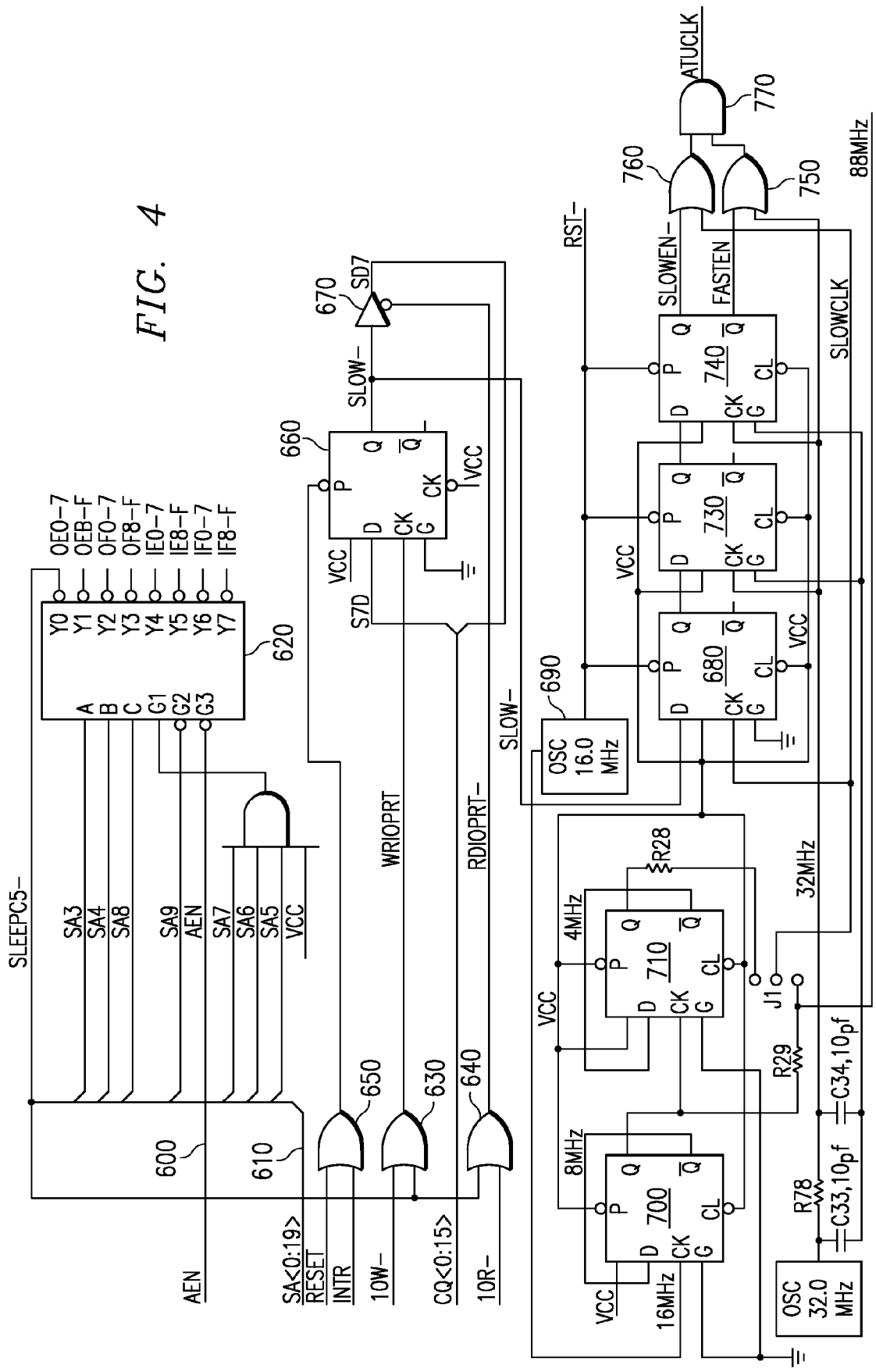
FIG. 4 is a schematic of the sleep hardware for one embodiment of the present invention.
Figure 5:
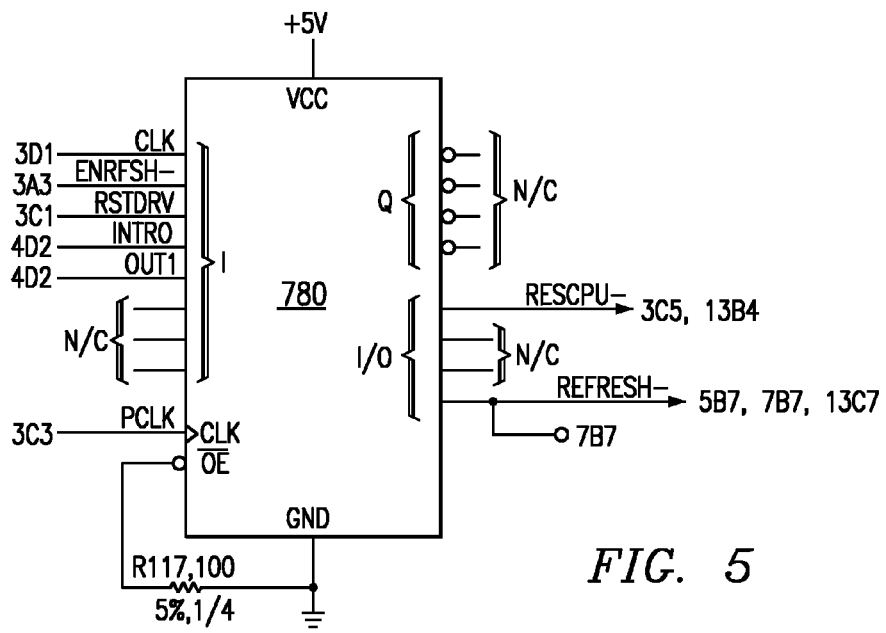
FIG. 5 is a schematic of the sleep hardware for another embodiment of the invention.

Looking now at FIG. 4, which depicts a schematic of an actual sleep hardware implementation for a system such as the Intel 80386 (CPU cannot have its clock stopped). Address enable bus 600 and address bus 610 provide CPU input to demultiplexer 620. The output of demultiplexer 620 is sent along SLEEPCS—and provided as input to OR gates 630, 640. The other inputs to OR gates 630, 640 are the I/O write control line and the I/O read control line, respectively. The outputs of these gates, in addition to NOR gate 650, are applied to D flip flop 660 to decode the port. "INTR" is the interrupt input from the I/O port (peripherals) into NOR gate 650, which causes the logic hardware to switch back to the high speed clock. The output of flip flop 660 is then fed, along with the output from OR gate 630, to tristate buffer 670 to enable it to read back what is on the port. All of the above-identified hardware is used by the read/write I/O port (peripherals) to select the power saving "Sleep" operation. The output "SLOW_" is equivalent to "SLEEP" in FIG. 2, and is inputted to flip flop 680, discussed later.

The output of SLEEP CLOCK oscillator 690 is divided into two slower clocks by D flip flops 700, 710. In the particular implementation shown in FIG. 4, 16 MHz sleep clock oscillator 690 is divided into 4 MHz and 8 MHz clocks. Jumper J1 selects which clock is to be the "SLEEP CLOCK".

In this particular implementation, high speed clock oscillator 720 is a 32 MHz oscillator, although this particular speed is not a requirement of the present invention. The 32 MHz oscillator is put in series with a resistor (for the implementation shown, 33 ohms), which is in series with two parallel capacitors (10 pF). The result of such oscillations is tied to the clocks of D flip flops 730, 740.

D flip flops 680, 730, 740 are synchronizing flip flops; 680, 730 were not shown in the simplified sleep hardware of FIG. 2. These flip flops are used to ensure the clock switch occurs only on clock edge. As can be seen in FIG. 4, as with flip flop 500 of FIG. 2, the output of flip flop 740 either activates OR gate 750 or OR gate 760, depending upon whether the CPU is to sleep ("FASTEN_") or awaken ("SLOWEN_").

OR gates 750, 760 and AND gate 770 are the functional equivalents to the AND/OR selector of FIG. 2. They are responsible for selecting either the "slowclk" (slow clock, also known as SLEEP CLOCK) or high speed clock (designated as 32 MHz on the incoming line). In this implementation, the Slow clock is either 4 MHz or 8 MHz, depending upon jumper J1, and the high speed clock is 32 MHz. The output of AND gate 770 (ATUCLK) establishes the rate of the CPU clock, and is the equivalent of CPU CLOCK of FIG. 2. (If the device includes a PCI bus, the output of AND gate 770 may also be coupled to the PCI bus if it is to utilize the clock signal.)

Consider now FIG. 5, which depicts a schematic of another actual sleep hardware implementation for a system such as the Intel 80286 (CPU can have its clock stopped). The Western Digital FE3600 VLSI is used for the speed switching with a special external PAL 780 to control the interrupt gating which wakes up the CPU on any interrupt. The software power conservation according to the present invention monitors the interrupt acceptance, activating the next P(i)deltaTi interval after the interrupt.

Any interrupt request to the CPU will return the system to normal operation. An interrupt request ("INTRQ") to the CPU will cause the PAL to issue a Wake Up signal on the RESCPU line to the FE3001 (not shown) which in turn enables the CPU and the DMA clocks to bring the system back to its normal state. This is the equivalent of the "Interrupt_" of FIG. 2. Interrupt Request is synchronized to avoid confusing the state machine so that Interrupt (INT-DET) will only be detected while the cycle is active. The rising edge of RESCPU will wake up the FE 3001 which in turn releases the whole system from the Sleep Mode.

Implementation for the 386SX is different only in the external hardware and software power conservation loop. The software loop will set external hardware to switch to the high speed clock on interrupt prior to vectoring the interrupt. Once return is made to the power conservation software, the high speed clock cycle will be detected and the hardware will be reset for full clock operation.

Implementation for OS/2 uses the "do nothing" loop programmed as a THREAD running in background operation with low priority. Once the THREAD is activated, the CPU sleep, or low speed clock, operation will be activated until an interrupt occurs thereby placing the CPU back to the original clock rate.

Although interrupts have been employed to wake up the CPU in the preferred embodiment of the present invention, it should be realized that any periodic activity within the system, or applied to the system, could also be used for the same function.

Figure 6:
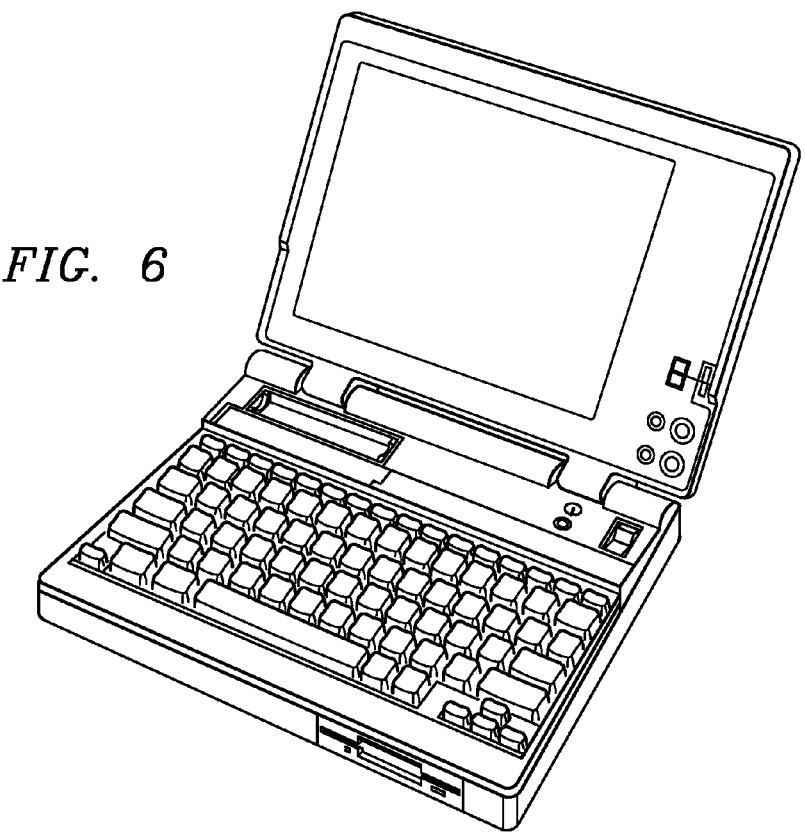
FIG. 6 is an elevational view of a portable computer.
Figure 7:
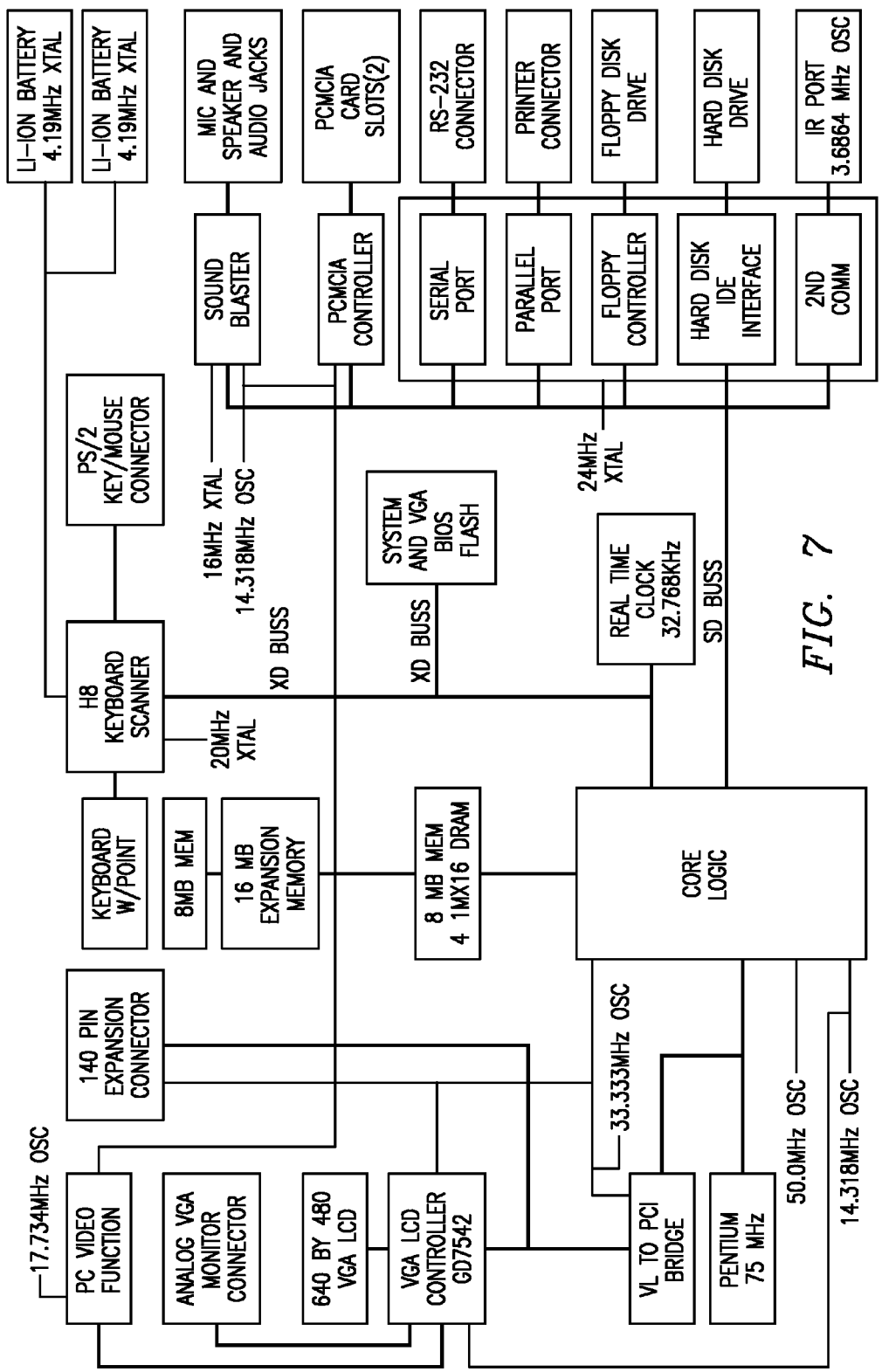
FIG. 7 is a block diagram of the portable computer of FIG. 6.

FIG. 6 illustrates a portable personal computer 800 having a display 810 and a keyboard 820. The present invention is ideally suited for thermal of the CPU in portable computer 800. FIG. 7 is a block diagram of portable computer 800. Portable computer 800 is a color portable notebook computer based upon the Intel Pentium microprocessor. Operating speed of the Pentium is 75 Mhz internal to the processor but with a 50 Mhz external bus speed. A 50 Mhz oscillator is supplied to the ACC Microelectronics 2056 core logic chip which in turn uses this to supply the microprocessor. This 50 Mhz CPU clock is multiplied by a phase locked loop internal to the processor to achieve the 75 Mhz CPU speed. The management features of the present invention may cause the CPU clock to stop periodically to conserve power consumption which reduces CPU temperature. The processor contains 16 KB of internal cache and 256 KB of external cache on the logic board.

The 50 Mhz bus of the CPU is connected to a VL to PCI bridge chip from ACC microelectronics to generate the PCI bus. The bridge chip takes a 33.333 Mhz oscillator to make the PCI bus clock. The Cirrus Logic GD7542 video controller is driven from this bus and this bus has an external connector for future docking options.

The GD542 video controller has a 14.318 Mhz oscillator input which it uses internally to synthesize the higher video frequencies necessary to drive an internal 10.4" TFT panel or external CRT monitors. When running in VGA resolution modes the TFT panel may be operated at the same time as the external analog monitor. For Super VGA resolutions only the external CRT may be used.

Operation input to portable computer 800 is made through the keyboard. An internal pointing device is imbedded in the keyboard. External connections are provided for a parallel device, a serial device, a PS/2 mouse or keyboard, a VGA monitor, and the expansion bus. Internal connections are made for a Hard Disk Drive, a Floppy Disk Drive, and additional memory.

Portable computer 800 contains 8 Megabytes of standard memory which may be increased by the user up to 32 Megabytes by installing optional expansion memory boards. The first memory expansion board can be obtained with either 8 or 16 Megabytes of memory. With the first expansion board installed another 8 Megabytes of memory may be attaches to this board to make the maximum amount.

A second serial port is connected to a Serial Infrared device. This SIR device has an interface chip which uses a 3.6864 Mhz oscillator. The SIR port can be used to transmit serial data to other computers so equipped.

The two batteries of portable computer 800 are Lithium Ion and have internal controllers which monitor the capacity of the battery. These controllers use a 4.19 Mhz crystal internal to the battery.

Portable computer 800 has two slots for PCMCIA cards. These slots may be used with third party boards to provide various expansion options. Portable computer 800 also has an internal sound chip set which can be used to generate or record music and/or sound effects. An internal speaker and microphone built into the notebook. In addition, three audio jacks are provide for external microphones, audio input, and audio output.

Figure 8:
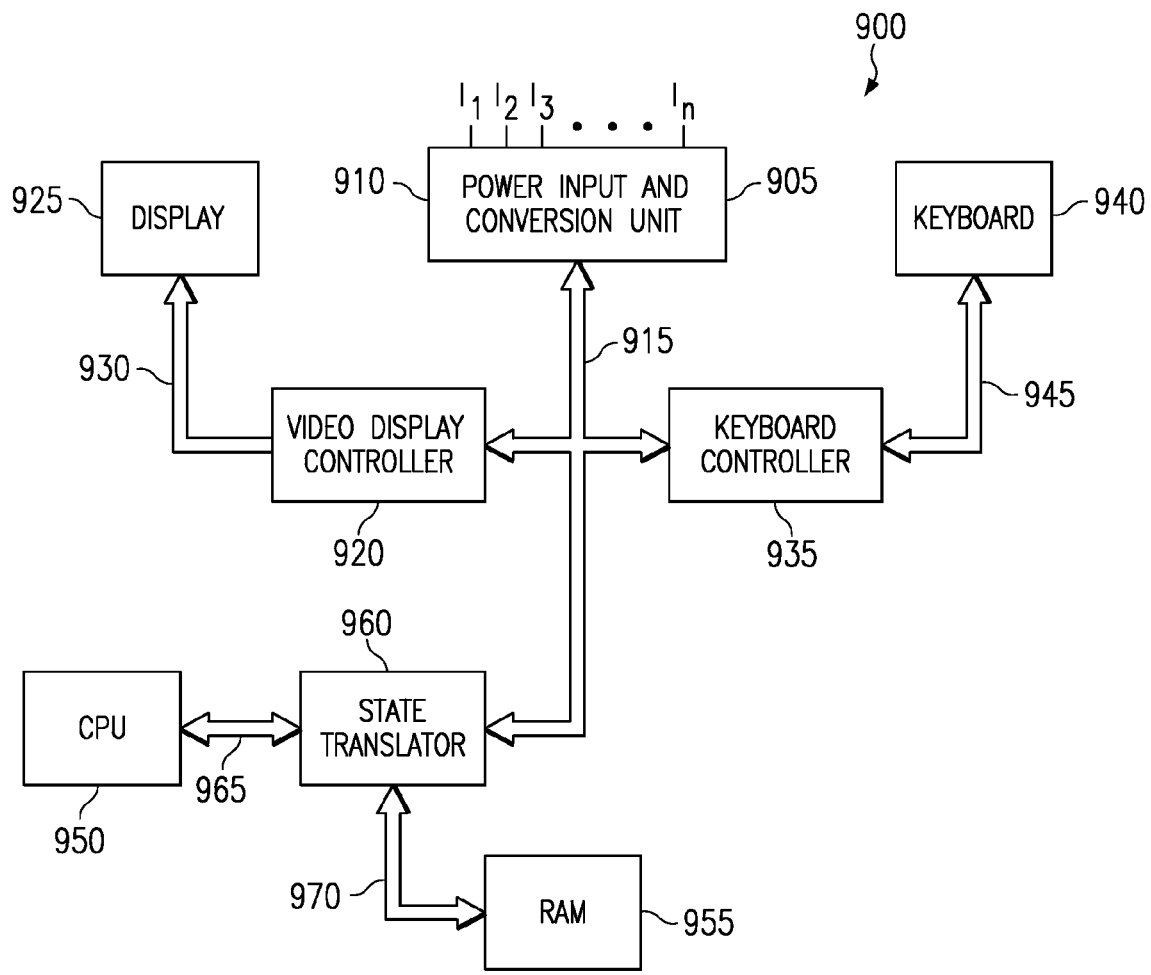
FIG. 8 is a block diagram of the electronic architecture of a basic computer.

While the present invention is recommended primarily for portable computers, the thermal management applicability of the present invention can also be integrated into any computer be it a main frame, mini, desk top or portable computer. FIG. 8 is a block diagram of a basic computer 900 upon which the present invention could be implemented. Computer 900 comprises a Power Input and Conversion Unit 905 having power input 910. Unit 905 senses the input conditions and selects appropriate circuitry to convert the input to the voltages needed to power the other elements of the system. Output from the conversion unit is coupled to Bus 915, which comprises paths for power as well as for digital information such as data and addresses.

Bus 915 typically needs more than one power line. For example, the motor drive for a hard disk requires a different power (voltage and current) than does a CPU, for example, so there are parallel power lines of differing size and voltage level in Bus 915. A typical Bus 915 will have, for example, a line for 24 VDC, another for 12 VDC, and yet another for 5 VDC, as well as multiple ground lines.

Bus 915 connects to a video display controller 920 including Video Random Access Memory (VRAM) which both powers and controls display 925, which in a preferred embodiment is a display driven by analog driver lines on an analog bus 930. Bus 915 also connects to a keyboard controller 935 which powers and controls keyboard 940 over link 945, accepting keystroke input and converting the input to digital data for transmission on Bus 915. The keyboard controller may be physically mounted in the keyboard or within the computer housing.

Bus 915 comprises, as stated above, both power and data paths. The digital lines are capable of carrying 32 addresses and conveying data in 32 bit word length. To minimize pin count and routing complexity, addresses and data are multiplexed on a single set of 32 traces in the overall bus structure. One with skill in the art will recognize that this type of bus is what is know in the art as a low-pin-count or compressed bus. In this kind of bus different types of signals, such as address and data signals, share signal paths through multiplexing. For example, the same set of data lines are used to carry both 32-bit addresses and data words of 32-bit length.

In Bus 915, some control signals, such as interrupt arbitration signals, may also share the data lines. Typical examples of buses that are exemplary as usable for Bus 215 (with the exception of power supply analog lines in Bus 915) are the IIS-Bus" implemented by Sun Microsystems, the "Turbochannel" Bus from Digital Equipment Corporation, and buses compatible with the IEEE-488 standard. Bus 915 is also a high-speed backplane bus for interconnecting processor, memory and peripheral device modules.

CPU 950 and RAM 955 are coupled to Bus 915 through state translator 960. CPU 950 may be of a wide variety of CPUs (also called in some cases MPUS) available in the art, for example Intel 80386 or 80486 models, MIPS, RISC implementations, and many others. CPU 950 communicates with State Translator 960 over paths 965. State Translator 960 is a chip or chip set designed to translate commands and requests of the CPU to commands and requests compatible with Bus 915. It was mention previously that CPU 950 may be one of a wide variety of CPUs, and that Bus 915 may be any one of a wide variety of compressed busses. It will be apparent to one with skill in the art that there may be an even wider variety of state translators 960 for translating between the CPU and Bus 915.

RAM memory module 955 comprises conventional RAM chips mounted on a PCB as is known in the art, and connectable to state translator 960. Preferably, the RAM module is "on board" the CPU module to provide for rapid memory access, which will be much slower if the RAM is made "off board". As is the case with Bus 915, paths 965 and 970 comprise power and ground lines for CPU 950 and Translator 960.

While several implementations of the preferred embodiment of the invention has been shown and described, various modifications and alternate embodiments will occur to those skilled in the art. As an example, when CPU temperature is to be detected, it can be detected directly via a thermistor in the CPU, on the CPU's casing, on a PWB adjacent the CPU, it can also be derived from the board temperature, the air within the vicinity of the CPU, temperature detected from other relevant components in the system (any relevant temperature measurement location could be used so long as it can be temperature gradient adjusted for its relevance to CPU operation). Even temperatures not related to CPU operation, such as high temperatures related to hard drive activity or battery charging operations can be detected and used in an embodiment of the invention that substitutes and/or combines non-CPU operation related temperatures for/with CPU operation related detected temperatures to provide computer thermal management through real-time reduction/stoppage and restoration of clock speeds.

Computer Programs Listing

1) .ASM—Interrupt 8 Timer interrupt service—(COMPUTER PROGRAM LISTING APPENDIX—pages 33 to 38). .ASM—Interrupt 8 Timer interrupt service is loaded onto the CPU ROM or an external RAM and is an interrupt mask that may be called at Step 240 of IDLE loop 60 or at Step 460 of ACTIVITY loop 70.
2) CPU Sleep Routine—(COMPUTER PROGRAM LISTING APPENDIX—page 39). CPU Sleep Routine is loaded onto the CPU ROM or an external RAM and is a file that may be called at Step 250 of IDLE loop 60 or ACTIVITY loop 70.
3) FILE=FORCE5.ASM—(COMPUTER PROGRAM LISTING APPENDIX—pages 40 to 44). FILE=FORCES.ASM is a PCI multiple sleep program that is loaded onto the CPU ROM or an external RAM and is a file that may be called at Step 250 of IDLE loop 60 or ACTIVITY loop 70.
4) FILE=Thermal.EQU—(COMPUTER PROGRAM LISTING APPENDIX—listed on page 45). FILE=Thermal.EQU is loaded onto the CPU ROM or an external RAM and is a file that may be called at STEP 240 of IDLE loop 60 or at Step 460 of ACTIVITY loop 70.
5) BA.ASM—Interrupt 8 Timer interrupt service—(COMPUTER PROGRAM LISTING APPENDIX—pages 46 to 51). BA.ASM—Interrupt 8 Timer interrupt service is loaded onto the CPU ROM or an external RAM and is an interrupt mask that may be called at Step 240 of IDLE loop 60 or at Step 460 of ACTIVITY loop 70.

6) Trange.INC—(COMPUTER PROGRAM LISTING APPENDIX—listed on pages 52 to 60). Trange.INC is loaded onto the CPU ROM or an external RAM and is an interrupt mask that may be called at Step 240 of IDLE loop 60

What is claimed is:

1. A method, comprising the steps of:
    detecting temperature associated with a processor;
    comparing said detected temperature with a reference temperature;
    repeating said detecting and comparing steps;
    changing the frequency of said repeating steps at selected temperatures; and
    using results of said detecting and comparing steps for reducing power consumption associated with said processor if at least one of said detected temperatures is at and/or above said reference temperature, wherein each of the above steps is performed in an electronic apparatus.

2. The method of claim 1, wherein said reduction in power consumption is accomplished in incremental steps.

3. The method of claim 1, wherein said reducing power consumption continues until one of: a) said processor has reached its minimum power consumption level; and b) said temperature is at and/or below a reference temperature.

4. The method of claim 1, wherein said power consumption is accomplished by lowering a clock frequency.

5. The method of claim 4, wherein said clock frequency is lowered in incremental steps.

6. The method of claim 1, wherein said reduction in power consumption is accomplished while said processor is processing data.

7. The method of claim 6, wherein said data is part of a program being run on said processor.

8. The method of claim 1, wherein said detecting is implemented on a periodic basis.

9. The method of claim 8, wherein the frequency of said detecting is modifiable.

10. The method of claim 1, wherein said step for reducing power consumption is avoided while said processor is processing critical I/O.

11. The method of claim 1, wherein said reduction in power consumption is accomplished by lowering a clock frequency utilized by said processor.

12. A method, comprising the steps of:
    dividing temperature into zones;
    detecting temperature associated with a processor;
    determining which temperature zone said detected temperature falls within; and
    using results of said determining step for reducing power consumption associated with said processor, wherein each of the above steps is performed in an electronic apparatus.

13. The method of method of claim 12, wherein said power consumption is accomplished by lowering a clock frequency.

14. The method of claim 13, wherein said clock frequency is towered in incremental steps.

15. The method of claim 12, wherein said reduction in power consumption is accomplished while said processor is processing data.

16. The method of claim 15, wherein said data is part of a program being run on said processor.

17. The method of claim 12, wherein said detecting is implemented on a periodic basis.

18. The method of claim 17, wherein the frequency of said detecting is modifiable.

19. The method of claim 12, wherein said step for reducing power consumption is avoided while said processor is processing critical I/O.

20. The method of claim 12, wherein said reduction in power consumption is accomplished by lowering a clock frequency utilized by said apparatus.

21. The method of claim 12, wherein the amount of said power consumption reduction is dependent on the temperature zone that the detected temperature falls within.

22. The method of claim 13, wherein more power consumption reduction is required when said detected temperature falls within a temperature zone having a higher temperature range than if said detected temperature falls within a temperature zone having a lower temperature range.

23. The method of claim 12, further comprising:
    repeating said detecting and comparing steps;
    changing the frequency of said repeating steps when the detected temperature changes from one zone to another zone.

24. An apparatus, comprising:
    circuitry for detecting temperature associated with a processor;
    circuitry for comparing said detected temperature with a reference temperature;
    circuitry for repeating said detecting and comparing steps;
    circuitry for changing the frequency of said repeating steps at selected temperatures; and
    circuitry for using results of said detecting and comparing steps for reducing power consumption associated with said processor if at least one of said detected temperatures is at and/or above said reference temperature.

25. The apparatus of method of claim 24, wherein said power consumption is accomplished by lowering a clock frequency.

26. The apparatus of claim 25, wherein said clock frequency is lowered in incremental steps.

27. The apparatus of claim 24, wherein said reduction in power consumption is accomplished while said processor is processing data.

28. The apparatus of claim 27, wherein said data is part of a program being run on said processor.

29. The apparatus of claim 24, wherein said detecting is implemented on a periodic basis.

30. The apparatus of claim 29, wherein the frequency of said detecting is modifiable.

31. The apparatus of claim 24, wherein said step for reducing power consumption is avoided while said processor is processing critical I/O.

32. The apparatus of claim 24, wherein said reduction in power consumption is accomplished by lowering a clock frequency utilized by said apparatus.

33. The apparatus of claim 24, wherein the amount of said power consumption reduction is dependent on the temperature zone that the detected temperature falls within.

34. The apparatus of claim 33, wherein more power consumption reduction is required when said detected temperature falls within a temperature zone having a higher temperature range than if said detected temperature falls within a temperature zone having a lower temperature range.

35. The apparatus of claim 24, further comprising:
    repeating said detecting and comparing steps;
    changing the frequency of said repeating steps when the detected temperature changes from one zone to another zone.

36. An apparatus, comprising the steps of:
  circuitry for dividing temperature into zones;
  circuitry for detecting temperature associated with a processor;
  circuitry for determining which temperature zone said detected temperature falls within; and
  circuitry for using results of said determining step for reducing power consumption associated with said processor.

37. The apparatus of claim 36, wherein the amount of said power consumption reduction is dependent on the temperature zone that the detected temperature falls within.

38. The apparatus of claim 37, wherein more power consumption reduction is required when said detected temperature falls within a temperature zone having a higher temperature range than if said detected temperature falls within a temperature zone having a lower temperature range.

39. The method of claim 36, further comprising:
  repeating said detecting and comparing steps;
  changing the frequency of said repeating steps when the detected temperature.

* * * * *